United States Patent
Manoharan et al.

(10) Patent No.: US 10,255,188 B2
(45) Date of Patent: Apr. 9, 2019

(54) MIGRATING WORKLOADS ACROSS HOST COMPUTING SYSTEMS BASED ON CACHE CONTENT USAGE CHARACTERISTICS

(71) Applicant: VMWARE, INC., Palo Alto, CA (US)

(72) Inventors: Manesh Varissery Manoharan, Bangalore (IN); Sivaprasad Kundoor Govindankutty, Bangalore (IN); Jubish Kulathumkal Jose, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 797 days.

(21) Appl. No.: 14/262,848

(22) Filed: Apr. 28, 2014

(65) Prior Publication Data

US 2015/0261459 A1  Sep. 17, 2015

(30) Foreign Application Priority Data

Mar. 17, 2014  (IN) .......................... 1404/CHE/2014

(51) Int. Cl.
*G06F 12/0875* (2016.01)
*G06F 9/50* (2006.01)

(52) U.S. Cl.
CPC ........ *G06F 12/0875* (2013.01); *G06F 9/5033* (2013.01); *G06F 2209/5022* (2013.01); *G06F 2212/452* (2013.01)

(58) Field of Classification Search
CPC .... G06F 3/0619; G06F 9/5033; G06F 3/0665; G06F 3/0689; G06F 3/0647; G06F 12/0875; G06F 2212/452; G06F 2209/5022

See application file for complete search history.

(56) References Cited

U.S. PATENT DOCUMENTS

| | | | | |
|---|---|---|---|---|
| 2008/0155537 A1* | 6/2008 | Dinda | .................... | G06F 9/4887 718/1 |
| 2012/0324444 A1* | 12/2012 | Gulati | .................... | G06F 9/5088 718/1 |
| 2014/0156958 A1* | 6/2014 | Dow | ....................... | G06F 3/0647 711/162 |
| 2014/0223122 A1* | 8/2014 | Butt | ....................... | G06F 9/5088 711/162 |

OTHER PUBLICATIONS

"Memory Buddies: Exploiting Page Sharing for Smart Colocation in Virtualized Data Centers", Timothy Wood, Gabriel Tarasuk-Levin, Prashant Shenoy, Peter Desnoyers, Emmanuel Cecchet, Mark D. Corner; VEE '09 proceedings of the 2009 ACM SIGPLAM/SIGOPS international conference on virtual execution environments.*

* cited by examiner

*Primary Examiner* — Michael Alsip

(57) ABSTRACT

Techniques for migrating workloads across host computing systems in a virtual computing environment are described. In one embodiment, workloads executing on different host computing systems that access identical contents that are stored on storage devices are identified, with the identical contents often being cached in a cache of each of the different host computing systems. Further, migration of one or more of the identified workloads is recommended to consolidate the identified workloads on a single host computing system, thereby allowing the identical contents to be cached within the single host computing system and allowing the identified workloads to access the cached identical contents from the single host computing system after migration in accordance with the recommendation.

36 Claims, 6 Drawing Sheets

| HASH SIGNATURE | UNIQUE HOST COMPUTING SYSTEM ID |
|---|---|
| HASHSIGNATURE1 | 1 |
| HASHSIGNATURE2 | 2 |
| HASHSIGNATURE3 | 2 |
| HASHSIGNATURE4 | 1 |
| HASHSIGNATURE1 | 2 |
| ⋮ | |
| HASHSIGNATUREN | 2 |

ADD NETWORK WIZARD

XYZ - CONNECTION SETTINGS
USE NETWORK LABELS TO IDENTIFY XYZ CONNECTIONS WHILE MANAGING YOUR HOST COMPUTING SYSTEMS AND MANAGEMENT SERVER

CONNECTION TYPE
NETWORK ACCESS
☐ CONNECTION SETTINGS
  IP SETTINGS
  SUMMARY

PORT GROUP PROPERTIES
NETWORK LABEL : XYZ
VLAN ID (OPTIONAL) : NONE (0) ▾

☐ USE THIS PORT GROUP FOR VMOTION
☐ USE THIS PORT GROUP FOR FAULT TOLERANCE LOGGING
☐ USE THIS PORT GROUP FOR MANAGEMENT TRAFFIC
☑ USE THIS PORT GROUP FOR CACHE DIGEST TRUNK TRAFFIC

NETWORK TYPE : IP (DEFAULT) ▾

PREVIEW :
XYZ PORT         PHYSICAL ADAPTERS
XYZ ☐ ────────── ☐ VMNIC1

[HELP]                              [< BACK] [NEXT >] [CANCEL]

MIGRATING WORKLOADS ACROSS HOST COMPUTING SYSTEMS BASED ON CACHE CONTENT USAGE CHARACTERISTICS

RELATED APPLICATIONS

Benefit is claimed under 35 U.S.C. 19(a)-(d) to Foreign application Serial No. 1404/CHE12014 filed in India entitled "MIGRATING WORKLOADS ACROSS HOST COMPUTING SYSTEMS BASED ON CACHE CONTENT USAGE CHARACTERISTICS", filed on Mar. 17, 2014, by VMware, Inc., which is herein incorporated in its entirety by reference for all purposes.

BACKGROUND

Nowadays, host based solutions are available that enable virtual desktop infrastructure (VDI) deployments capable of providing a robust platform for enterprises hosting virtual desktops from virtual management software (VMS). VDI deployments can scale up by increasing back-end computing power and by adding storage space for desktop consolidation. Storage space may preserve virtual machine (VM) images which load to memory of host computing systems to make the desktops live. A typical performance bottleneck is an input/output (I/O) request issued from a VM to an underlying storage for accessing data contents from the VM images. Existing techniques leveraged in the VDI by configuring content based read cache (CBRC) in each host computing system to address such bottleneck issues (e.g., boot storms) when multiple VMs are powered on simultaneously.

However, the CBRC is a per host random access memory (RAM) based solution in the VDI. One limitation with such host specific solutions may be that it can be leveraged only within a single host computing system. However, virtual desktop environments are, typically, deployed on a cluster including multiple host computing systems. In such a virtual computing environment, the above limitation may become crucial. For example, in some implementations, the CBRC is limited to a maximum of 2 gigabytes (GB). During operation, once cached contents reach the maximum limit, the CBRC may remove existing cached contents to accommodate newer cache requirements. It can be envisioned that, during operation, the removed cached contents may be required again by one or more of VMs running on the host computing systems, which can result in unnecessary overhead as data needs to be fetched back into the cache. Further, the 2 GB limitation for the CBRC may become inadequate in the above host specific solution. Increasing the 2 GB limitation may not be a feasible solution in view of other memory requirements. In addition, typically, in a virtual desktop environment, VMs are spanned across multiple host computing systems in a cluster, and similar contents are cached across all host computing systems. This can result in significant content cache duplication in the cluster.

BRIEF DESCRIPTION OF THE DRAWINGS

FIG. 3 is a screenshot showing configuring of a cache digest trunk (CDT), according to an example embodiment.

DETAILED DESCRIPTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Embodiments described herein provide enhanced computer-based and network-based methods, techniques, and systems for migrating workloads (e.g., virtual machines (VMs)) across host computing systems based on cache content usage characteristics. The proposed technique creates a global digest table (GDT) in memory of a host computing system in a cluster to store hash signatures of metadata associated with current read contents and associated host computing system IDs. Further, the proposed technique replicates the GDT in memories of remaining host computing systems via a cache digest trunk (CDT). Furthermore, the proposed technique updates the GDTs whenever the VMs read requested contents from a cache of associated host computing systems or storage devices (e.g., virtual machine file system (VMFS) storages) in a predetermined time interval. In addition, the proposed technique analyzes the hash signatures of the metadata associated with the read contents along with the associated host computing system IDs in the GDT for the cache content usage characteristics. For example, the cache content usage characteristics may include locations of the VMs in the host computing systems, requested contents requested by the VMs and frequency of read requests made for substantially same contents. Also, the proposed technique creates a recommendation to migrate the VMs across the host comporting systems based on the outcome of the analysis.

System Overview and Examples of Operation

Figure 1:
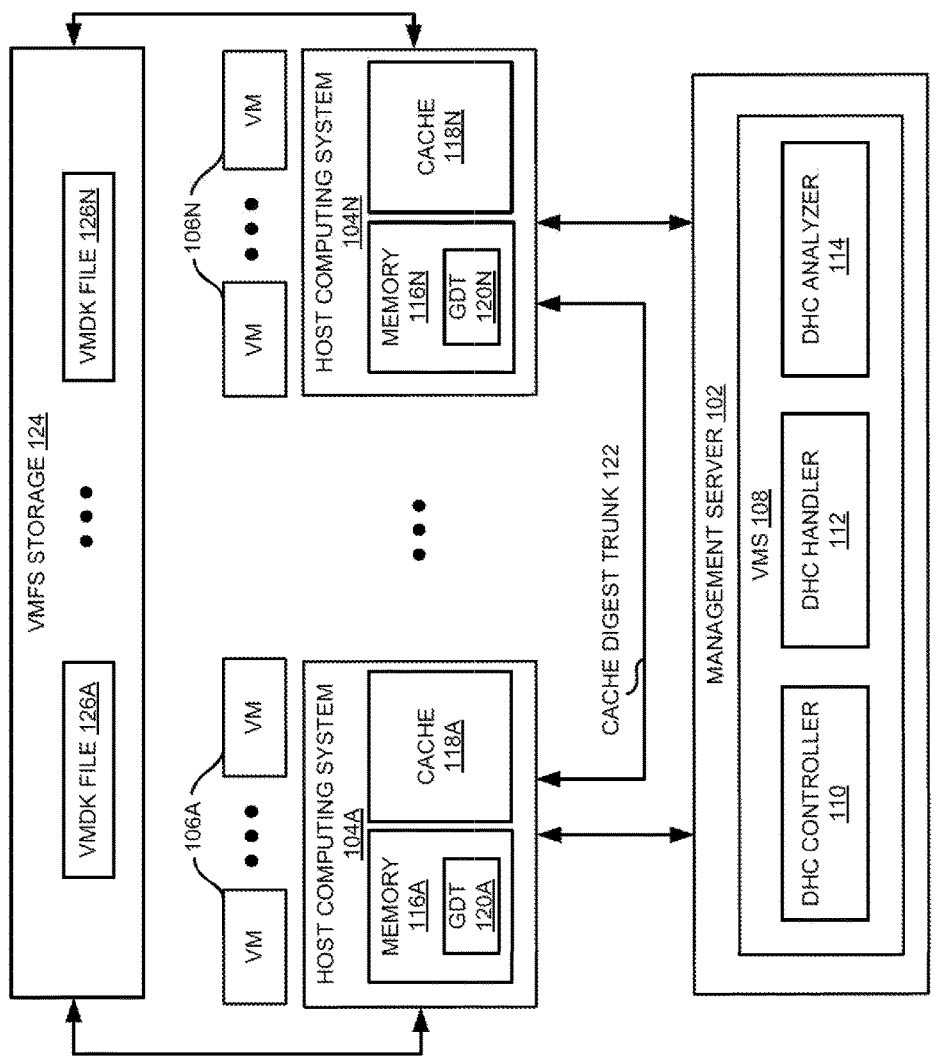
FIG. 1 is a block diagram illustrating a system for migrating workloads across host computing systems based on cache content usage characteristics in a virtual computing environment, according to an example embodiment.

FIG. 1 is a block diagram illustrating a system for migrating VMs across host computing systems based on cache content usage characteristics in virtual computing environment 100, according to an example embodiment. As shown in FIG. 1, virtual computing environment 100 includes host computing systems 104A-N and associated VMs 106A-N hosted by host computing systems 104A-N in a cluster. Further, host computing systems 104A-N include memories 116A-N (e.g., a main memory) and caches 118A-N, respectively. Example cache includes a reserved memory or a high speed storage device. Also as shown in FIG. 1, virtual computing environment 100 includes management server 102 that is communicatively coupled to host computing systems 104A-N. Further as shown in FIG. 1, management server 102 includes virtual management software (VMS) 108. Furthermore as shown in FIG. 1, VMS 108 includes distributed host cache (DHC) controller 110, DHC handler 112, and DHC analyzer 114. DHC handler 112 may handles operations performed by DHC controller 110 and DHC analyzer 114. Moreover as shown in FIG. 1, virtual computing environment 100 includes VMFS storage 124 communicatively coupled to host computing systems 104A-N. Also, VMFS storage 124 includes virtual memory disk (VMDK) files 126A-N associated with VMs 106A-N.

Figure 2:
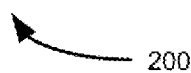
FIG. 2 is a global digest table (GDT), according to an example embodiment.

In operation, DHC controller 110 identifies VMs executing on different host computing systems 104A-N that access identical contents that are stored on VMFS storage 124, with the identical contents often being cached in caches 118A-N of each of different host computing systems 104A-N. In one embodiment, DHC controller 110 creates a GDT (e.g., GDT 120A) upon enabling a host computing system (e.g., host computing system 104A) in the cluster. For example, the GDT includes hash signatures of metadata associated with current read contents and associated host computing system IDs. For example, the content may include a length of 4 kilobytes. The host computing IDs are unique host computing IDs used for tagging the host computing systems in the GDT. In an example embodiment, DHC controller 110 looks for a CDT port in a host computing system and assigns an unique host computing system ID to the host computing system when the host computing system includes the CDT port. The table 200 in FIG. 2 shows an example embodiment of a GDT. As shown in GDT 200, unique host computing system IDs 1 and 2 are unique host computing system IDs of any two of host computing systems 104A-N, respectively.

Further, DHC controller 110 loads created GDT 120A onto memory 116A of host computing system 104A. Furthermore, DHC controller 110 loads created GDT 120A onto memories 116B-N of each of remaining host computing systems (e.g., host computing systems 104B-N) via CDT 122 upon powering on VMs 106B-N associated with each subsequent host computing system 104B-N in the cluster. In other words, DHC controller 110 replicates GDT 120A in memories 116B-N of remaining host computing systems 104B-N via CDT 122. For example, CDT 122 is configured via kernel network settings as shown in example screenshot 300. In one example, CDT 122 is used to share GDT 120A across host computing systems 104A-N. In other words, via a designated port for CDT 122, DHC controller 110 replicates GDT 120A in memories 116B-N of remaining host computing systems 104B-N in the cluster. GDTs 120A-N in host computing systems 104A-N are identical to each other.

Also in operation, DHC controller 110 dynamically updates hash signatures of metadata associated with contents read by VMs 106A-N along with associated host computing system IDs in GDTs 120A-N residing in host computing systems 104A-N for a predetermined time interval. In one embodiment, DHC controller 110 receives read requests for contents stored in VMDK files 126A-N from VMs 106A-N associated with host computing systems 104A-N. Further, DHC controller 110 determines whether each requested content associated with VMS 106A-N is in caches 118A-N of respective host computing systems 104A-N using, GDTs 120A-N residing in associated host computing systems 104A-N. Furthermore, DHC controller 110 reads the requested contents from caches 118A-N of associated host computing systems 104A-N, if the requested contents associated with VMs 106A-N are in caches 118A-N of associated host computing systems 104A-N. In addition, DHC controller 110 reads any of remaining requested contents from respective VMDK files 126A-N located in VMFS storage 124, stores the read contents in caches 118A-N of associated host computing systems 104A-N, and adds the hash signatures of the metadata associated with the read contents along with the associated host computing system IDs in GDTs 120A-N. Moreover, DHC controller 110 repeats the step of determining for the predetermined time interval.

In some embodiments, anytime a hash signature of metadata associated with current read content along with the associated host computing ID is added to one of GDTs (e.g., GDT 120A), DHC controller 110 substantially simultaneously updates all of remaining GDTs GDTs 120B-N) via CDT 122. Further in some embodiments, anytime a host computing system gets added to the cluster, DHC controller 110 substantially simultaneously replicates GDT 120A to memory of the added host computing system via CDT 122. Also in some embodiments, any time a host computing system is removed from the cluster, DHC controller 110 substantially simultaneously updates each of GDTs 120A-N by removing corresponding hash signatures and associated host computing system ID via CDT 122.

Further in operation, DHC analyzer 114 identifies the VMs executing on different host computing systems 104A-N that access the identical contents by analyzing the hash signatures of the metadata associated with the read contents along with the associated host computing system IDs in GDTs 120A-N for the cache content usage characteristics. For example, the cache content usage characteristics may include locations of VMs 106A-N in host computing systems 104A-N, contents requested by the VMs and frequency of read requests made for substantially same contents. Furthermore, DHC analyzer 114 recommends migration of one or more of the identified VMs to consolidate the identified VMs on one of host computing systems 104A-N, thereby allowing the identical contents to be cached within one of host computing systems 104A-N and allowing the identified VMs to access the cached identical contents from one of host computing systems 104A-N after migration in accordance with the recommendation. In one embodiment, DHC analyzer 114 creates a recommendation for migrating VMs 106A-N across host computing systems 104A-N in the cluster based on the outcome of the analysis. Moreover, DHC controller 110 and DHC analyzer 114 repeat the associated steps of updating, analyzing and creating the recommendation for a next predetermined time interval.

In one example, DHC analyzer 114 analyzes hash signatures of metadata associated with read contents along with associated host computing system IDs in GDT 200 for cache content usage characteristics. Further, DHC analyzer 114 determines that VM1 and VM2 which are running on host computing system1 and host computing system2, respectively, read content having hashsignature1 of metadata associated with the content. In this case, the content is cached in caches of both host computing system1 and host computing system2. Furthermore, DHC analyzer 114 creates a recommendation to migrate VM1 or VM2 based on available computing resources on host computing system1 and host computing system2. In this example, if VM1 is migrated to host computing system2 to read the content from the cache of host computing system2, then the content in the cache of host computing system1 is removed. For example, VM1 and VM2 can be any of VMs 106A-N and host computing system1 and host computing system2 can be any of host computing systems 104A-N.

Also, although certain terms are used primarily herein, other terms could be used interchangeably to yield equivalent embodiments and examples. For example, the term "host computing system" may be used interchangeably with "physical host", "physical machine" or "physical device". Further for example, it is well-known that equivalent terms in the field of system virtualization or similar or related fields could be substituted for such terms as "physical computer," "hypervisor," "virtual machine," or the like. Further, the terms "virtual computing environment" and "virtual datacenter" are used interchangeably throughout the document.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 4A:
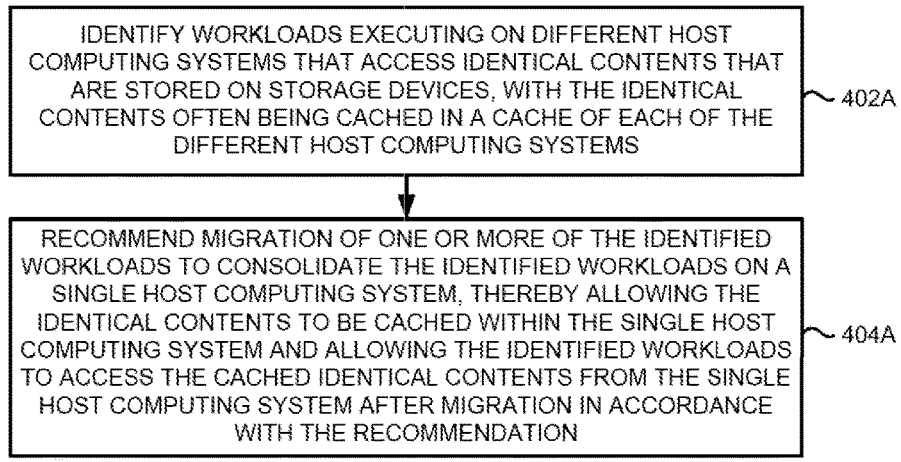
FIG. 4A is a flow diagram of a process for creating a workload migration recommendation in a virtual computing environment, according to an example embodiment.

FIG. 4A is a flow diagram 400A of a process for creating a workload migration recommendation in a virtual computing environment, according to an example embodiment. At block 402A, workloads executing on different host computing systems that access identical contents that are stored on storage devices are identified. The identical contents often being cached in a cache each of the different host computing systems. At block 404A, migration of one or more of the identified workloads is recommended to consolidate the identified workloads on a single host computing system, thereby allowing the identical contents to be cached within the single host computing system and allowing the identified workloads to access the cached identical contents from the single host computing system after migration in accordance with the recommendation. This is explained in more detail with reference to FIG. 4B.

Figure 4B:
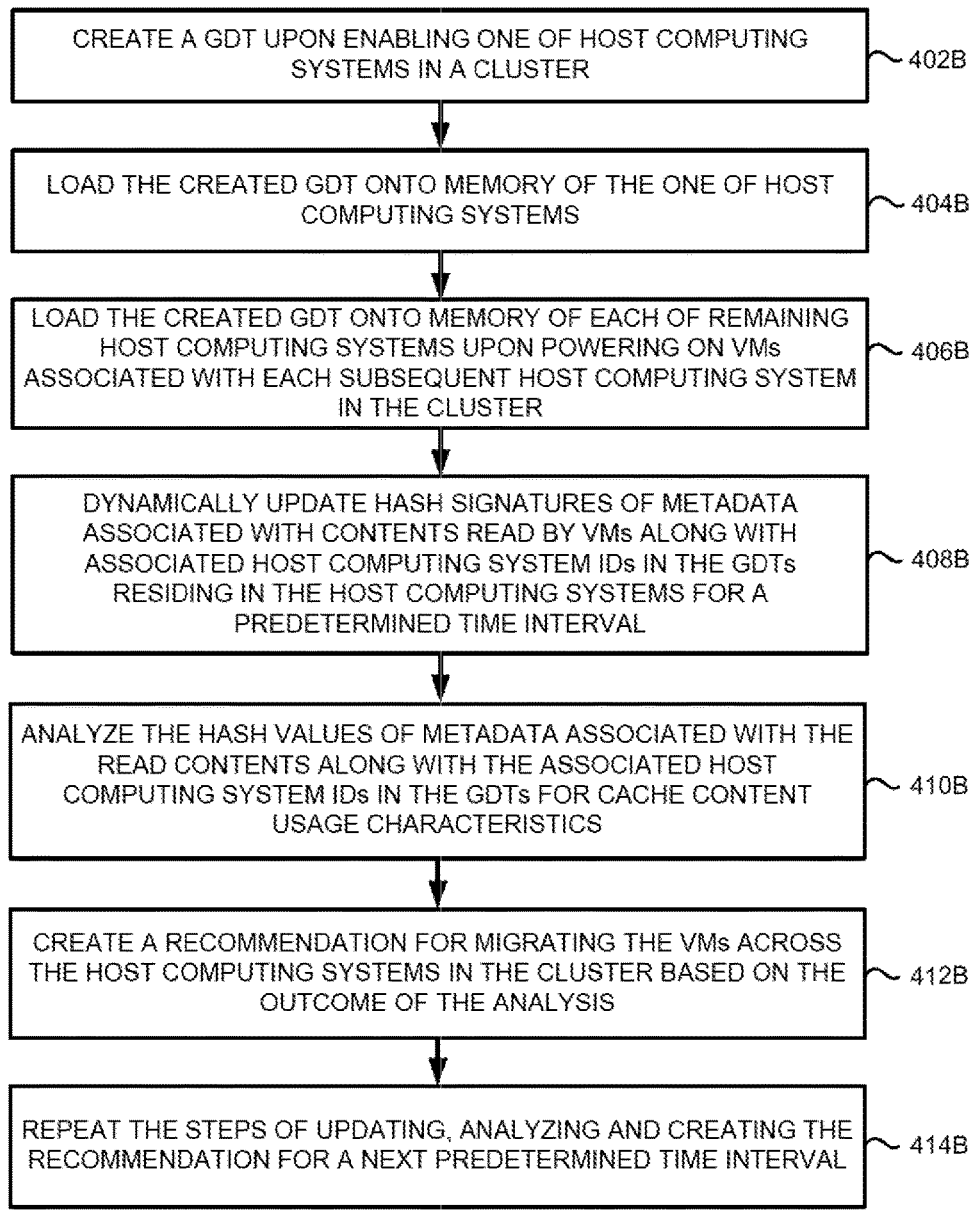
FIG. 4B is a flow diagram of a process for migrating workloads across host computing systems based on cache content usage characteristics in a virtual computing environment, according to an example embodiment.

FIG. 4B is a flow diagram 400B of a process for migrating VMs across host computing systems in a cluster based on cache content usage characteristics in a virtual computing environment, according to an example embodiment. FIG. 4B illustrates migrating the VMs across the host computing systems based on cache content usage characteristics that may be performed by, for example, one or more modules of a DHC controller, a DHC handler and/or a DHC analyzer residing in a management server described above.

At block 402B, a GDT is created upon enabling one of the host computing systems in the cluster. In these embodiments, the GDT includes hash signatures of metadata associated with current read contents and associated host computing system IDs. Example contents include a length of 4 kilo bytes. The host computing IDs are assigned unique host computing IDs used for tagging the host computing systems in the GDT. The table 200 in FIG. 2 shows an example GDT. At block 404B, the created GDT is loaded onto memory of the one of the host computing systems. At block 406B, the GDT is loaded onto memory of each of remaining host computing systems in the cluster via a CDT upon powering on the VMs associated with each subsequent host computing system in the cluster. For example, the CDT is configured via kernel network settings as shown in FIG. 3. In one example, the CDT is used to share the GDT across the host computing systems.

At block 408B, hash signatures of metadata associated with contents read by the VMs along with associated host computing system IDs are dynamically updated in the GDTs residing in the host computing systems for a predetermined time interval. In one embodiment, read requests for the contents stored in VMDK files located in a VMFS storage are received from the VMs associated with the host computing systems in the cluster. Further in this embodiment, a check is made to determine whether each requested content associated with a VM is in a cache of an associated host computing system using the GDT residing in memory of the associated host computing system. Furthermore, the requested contents is read from the cache of the associated host computing system, if the requested contents associated with the VM are in the cache of the associated host computing system. Moreover, any of remaining requested contents are read from an associated VMDK file, if any of requested contents associated with the VM are not in the cache of the associated host computing system. Also, the read contents are stored in the cache associated with the host computing system. Hash signatures of the metadata associated with the read contents along with the associated host computing system IDs are then added to the GDTs. Further, the step of determining is repeated for the predetermined time interval.

In some embodiments, anytime a hash signature of metadata associated with current read content along with the associated host computing ID is added to one of the GDTs, all remaining GDTs in the cluster are substantially simultaneously updated via the CDT. Further in some embodiments, anytime a host computing system gets added to the cluster, the GDT is substantially simultaneously replicated to memory of the added host computing system via the CDT. Also in some embodiments, any time a host computing system is removed from the cluster, each GDT is substantially simultaneously updated by removing corresponding hash signatures and an associated host computing system ID via the CDT.

At block 410B, the hash signatures of the metadata associated with the read contents along with the associated host computing system IDs in the GDTs are analyzed for the cache content usage characteristics. Example cache content usage characteristics are locations of the VMs in the host computing systems, contents by the VMs, frequency of read requests made for substantially same contents, and the like. At block 412B, a recommendation for migrating the VMs across the host computing systems in the cluster is created based on the outcome of the analysis. At block 414B, process steps 408B, 410B and 412B are repeated for a next predetermined interval.

Similarly, a recommendation for migrating VMs across host computing systems in the cluster can be created based on cache content usage characteristics before powering on the VMs. In one embodiment, a VMDK file of each VM is associated with a digest VMDK, which contains metadata for cache contents. When a first VM powers on, this metadata is also loaded to memory associated with a host computing system on which the first VM is powered on and keeps index of content caching. Further, when a second VM requests a power on, the associated offline digest file is compared with the online one of those loaded along with the first VM and a recommendation where to power on the second VM is created.

Example Computing System Implementation

Figure 5:
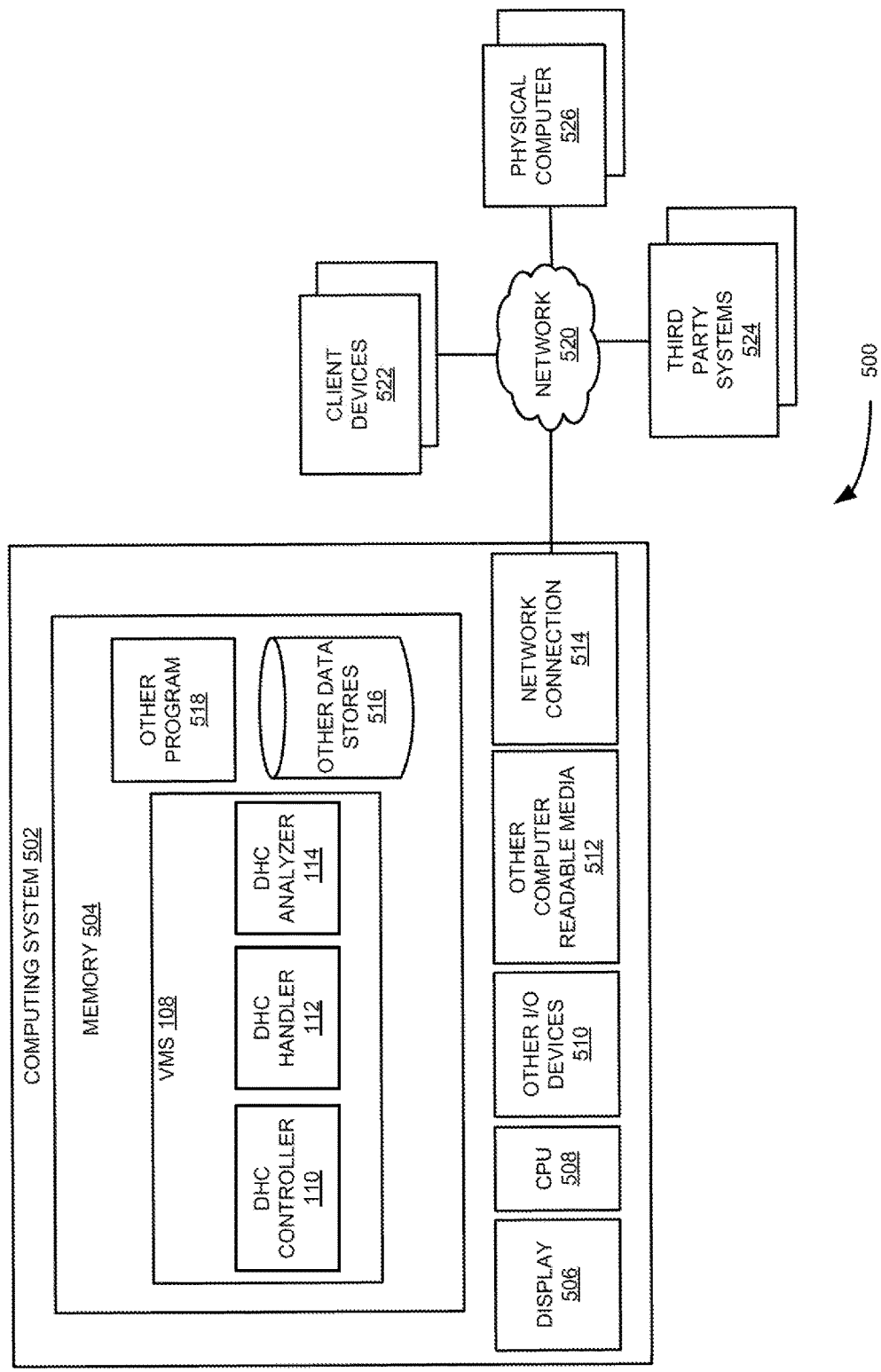
FIG. 5 is a block diagram of a computing system for migrating the workloads across the host computing systems based on the cache content usage characteristics in the virtual computing environment, according to an example embodiment.

FIG. 5 is a block diagram 500 of an example computing system for migrating VMs across host computing systems based on cache content usage characteristics in a virtual computing environment, according to an example embodiment. In particular, FIG. 5 shows computing system 502 that may be utilized to implement VMS 108, such as shown in FIG. 1.

Note that one or more general purpose virtual or physical computer systems suitably instructed may be used to implement VMS 108 including DHC controller 110, DHC handler 112 and or DHC analyzer 114 (shown in FIG. 1). In addition, computing system 502 may comprise one or more distinct computing systems/devices and may span distributed locations. Furthermore, each block shown may represent one or more such blocks as appropriate to a specific embodiment or may be combined with other blocks. Also, VMS 108 including DHC controller 110, DHC handler 112 and/or DHC analyzer 114 may be implemented in software, hardware, firmware, or in some combination to achieve the capabilities described herein.

In the embodiment shown, computing system 502 may comprise computer memory ("memory") 504, display 506, one or more Central Processing Units ("CPU") 508, Input/output (I/O) devices 510 (e.g., keyboard, mouse, etc.), other computer-readable media 512, and network connections 514. VMS 108 is shown residing in memory 504. The components of VMS 108 may execute on one or more CPUs 508 and implement techniques described herein. Other code or programs 518 (e.g., an administrative interface, a Web server, and the like) and potentially other data repositories, such as data store 516, may also reside in memory 504, and execute on one or more CPUs 508. One or more of the components in FIG. 5 may not be present in any specific implementation. For example, some embodiments may not provide other computer readable media 512 or display 506.

VMS 108 interacts via network 520 with client devices 522, physical computers 526, and/or third-party systems/applications 524. Network 520 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

As discussed above with reference to FIG. 1, VMS 108 including DHC controller 110, DHC handler 112 and/or DHC analyzer 114 migrates VMs across host computing systems based on cache content usage characteristics in the virtual network environment. The architecture shown in FIG. 5 may in some embodiments be partially fully virtualized. For example, computing system 502 may be one or possibly many VMs executing on physical hardware and managed by a hypervisor, virtual machine monitor, or similar technology. Also, physical computers 526 may include virtualization logic to manage multiple VMs.

In an example embodiment, components/modules of VMS 108 are implemented using standard programming techniques. For example, VMS 108 may be implemented as a "native" executable running on CPU 508, along with one or more static or dynamic libraries. In other embodiments, VMS 108 may be implemented as instructions processed by a VM that executes as one of other programs 518.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

Furthermore, in some embodiments, some or all of the components of VMS 108 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents as executable or other machine-readable software instructions or structured data) on a non-transitory computer-readable storage medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Further, from the foregoing it will be appreciated that, although specific embodiments have been described herein for purposes of illustration, various modifications may be made without deviating from the spirit and scope of this disclosure. For example, the methods, techniques, and systems for migrating the VMs across host computing systems based on the cache content usage characteristics in the virtual computing environment are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method of creating a workload migration recommendation comprising:
  loading a global digest table (GDT) onto memory of host computing systems in a cluster;
  dynamically updating hash signatures of metadata associated with contents read by workloads running on the host computing systems along with associated host computing system identifiers (IDs) in the GDT for a predetermined time interval;

identifying workloads executing on a first host computing system and a second host computing, system that access identical contents that are stored on storage devices, wherein the identical contents are often being cached in a cache of the first host computing system and the second host computing system;

determining cache content usage characteristics of the first host computing system and the second host computing system by analyzing the hash signatures of the metadata associated with the read contents along with the associated host computing system IDs in the GDT, wherein the cache content usage characteristics comprise a frequency of read requests made by the workloads for substantially same contents; and recommending migration of at least one of the identified workloads from the first host computing system to the second host computing system based on the cache content usage characteristics, thereby allowing the identical contents to be cached within the cache of the second host computing system and allowing the migrated workloads to access the identical contents cached in the cache of the second host computing system after migration in accordance with the recommendation.

2. The method of claim 1, wherein recommending migration of at least one of the identified workloads to consolidate the identified workloads on a single host computing system, comprises:

creating a recommendation for migrating the workloads across the host computing systems in the cluster based on the outcome of the analysis.

3. The method of claim 2, further comprising:

repeating the steps of updating, analyzing and creating the recommendation for a next predetermined time interval.

4. The, method of claim 1, wherein dynamically updating the hash signatures of metadata associated with the contents read by the workloads along with the associated host computing system IDs in the GDT for the predetermined time interval, comprises:

determining whether each requested content associated with a workload is in a cache of an associated host computing system using the GDT residing in memory of the associated host computing system;

if so, reading the requested contents from the cache of the associated host computing system;

if not, reading any of remaining requested contents from the storage devices, storing the read contents in the cache associated with the host computing system, and adding the hash signatures of the metadata associated with the read contents along with the associated host computing system IDs in the GDT; and repeating the step of determining for the predetermined time interval.

5. The method of claim 4, further comprising:

receiving read requests for the contents stored in virtual memory disk (VMDK) files located in the storage devices from the workloads associated with the host computing systems in the cluster.

6. The method of claim 1, further comprising:

substantially simultaneously updating each of remaining CDTs upon adding a hash signature of metadata associated with current read content along with an associated host computing system ID in one of the GDTs via a cache digest trunk (CDT).

7. The method of claim 1, further comprising:

substantially simultaneously updating each GDT by removing corresponding hash signatures and associated host computing system IDs via a cache digest trunk (CDT) upon removing any one of the host computing systems in the cluster.

8. The method of claim 1, further comprising:

substantially simultaneously creating a replica of the GDT in a host computing system via a cache digest trunk (CDT) upon adding the host computing system in the cluster.

9. The method of claim 1, wherein the host computing system IDs are assigned unique host computing system IDs for tagging the host computing systems in the GDT.

10. The method of claim 1, wherein the cache content usage characteristics are locations of the workloads in the host computing systems, contents requested by the workloads and frequency of read requests made for substantially same contents.

11. The method of claim 1, wherein the content comprises a length of 4 kilo bytes.

12. A system, comprising:

multiple host computing systems, wherein each host computing system executing multiple workloads;

storage devices communicatively coupled to the multiple host computing systems; and a management server communicatively coupled to the multiple host computing systems, wherein the management server comprises virtual management software (VMS) to create a workload migration recommendation in a virtual computing environment, by:

loading a global digest table (GUI) onto memory of host computing systems in a cluster;

dynamically update hash signatures of metadata associated with contents read by workloads running on the host computing systems along with associated host computing system identifiers (IDs) in the GDT for a predetermined time interval;

identify workloads executing on a first host computing system and a second host computing system that access identical contents that are stored on the storage devices, wherein the identical contents are often being cached in a cache of the first host computing system and the second host computing system;

determine cache content usage characteristics of the first host computing system and the second host computing system by analyzing the hash signatures of the metadata associated with the read contents along with the associated host computing system IDs in the GDT, wherein the cache content usage characteristics comprise a frequency of read requests made by the workloads for substantially same contents; and recommend migration of at least one of the identified workloads from the first host computing system to the second host system based on the cache content usage characteristics, thereby allowing the identical contents to be cached within the cache of the second host computing system and allowing the migrated workloads to access the identical contents cached in the cache of the second host computing system after migration in accordance with the recommendation.

13. The system of claim 12, wherein the VMS is configured to:

create a recommendation for migrating the workloads across the multiple host computing systems in the cluster based on the outcome of the analysis.

14. The system of claim 13, wherein the VMS is further configured to:
  repeat the steps of updating, analyzing and creating the recommendation for a next predetermined time interval.

15. The system of claim 12, wherein the VMS is configured to:
  determine whether each requested content associated with a workload is in a cache of an associated host computing system using the GDT residing in the memory of the associated host computing system;
  if so, read the requested contents from the cache of the associated host computing system;
  if not, read any of remaining requested contents from the storage devices, storing the read contents in the cache associated with the host computing system, and adding the hash signatures of the metadata associated with the read contents along with the associated host computing system IDs in the GDT, and
  repeat the step of determining for the predetermined time interval.

16. The system of claim 15, wherein the VMS is further configured to:
  receive read requests for the contents stored in the storage devices from the workloads associated with the host computing systems in the cluster.

17. The system of claim 12, wherein the VMS is further configured to:
  substantially simultaneously update each of remaining CDTs upon adding a hash signature of metadata associated with current read content along with an associated host computing system ID in one of the GDTs via a cache digest trunk (CDT).

18. The system of claim 12, wherein the VMS is further configured to:
  substantially simultaneously update each GDT by removing corresponding hash signatures and associated host computing system IDs via a cache digest trunk (CDT) upon removing any one of the multiple host computing systems in the cluster.

19. The system of claim 12, wherein the VMS is further configured to:
  substantially simultaneously create a replica of the GDT in a host computing system via a cache digest trunk (CDT) upon adding the host computing system in the cluster.

20. The system of claim 12, herein the host computing system IDs are assigned unique host computing system IDs for tagging the host computing systems in the GDT.

21. The system of claim 12, wherein the cache content usage characteristics are locations of the workloads in the host computing systems, contents requested by the workloads and frequency of read requests made fir substantially same contents.

22. The system of claim 12, wherein the content comprises a length of 4 kilo bytes.

23. A non-transitory computer-readable storage medium including instructions that are configured, when executed by a computing device, to perform a method of creating a workload migration recommendation, the method comprising:
  loading a global digest table (GDT) onto memory of host computing systems in a cluster;
  dynamically updating hash signatures of metadata associated with contents read by workloads running on the host computing systems along, with associated host computing system identifiers (IDs) in the GDT for a predetermined time interval;
  identifying workloads executing on a first host computing system and a second host computing system that access identical contents that are stored on storage devices, wherein the identical contents are often being cached in a cache of the first host computing system and the second host computing system;
  determining cache content usage characteristics of the first host computing system and the second host computing system by analyzing the hash signatures of the metadata associated with the read contents along with the associated host computing system IDs in the GDT, wherein the cache content usage characteristics comprise a frequency of read requests made by the workloads for substantially same contents; and
  recommending migration of at least one of the identified workloads from the first host computing system to the second host system based on the cache content usage characteristics, thereby allowing the identical contents to be cached within the cache of the second host computing system and allowing the migrated workloads to access the identical contents cached in the cache of the second host computing system after migration in accordance with the recommendation.

24. The non-transitory computer-readable storage medium of claim 23, wherein recommending migration of at least one of the identified workloads to consolidate the identified workloads on a single host computing system, comprises:
  creating a recommendation for migrating the workloads across the host computing systems in the cluster based on the outcome of the analysis.

25. The non-transitory computer-readable storage medium of claim 24, further comprising:
  repeating the steps of updating, analyzing and creating the recommendation for a next predetermined time interval.

26. The non-transitory computer-readable storage medium of claim 23, wherein dynamically updating the hash signatures of metadata associated with the contents read by the workloads along with the associated host computing system IDs in the GDT for the predetermined time interval, comprises:
  determining whether each requested content associated with a workload is in a cache of an associated host computing system using the GDT residing in memory of the associated host computing system;
  if so, reading the requested contents from the cache of the associated host computing system;
  if not, reading any of remaining requested contents from the storage devices, storing the read contents in the cache associated with the host computing system, and adding the hash signatures of the metadata associated with the read contents along with the associated host computing system IDs in the GDT; and
  repeating the step of determining for the predetermined time interval.

27. The non-transitory computer-readable storage medium of claim 26, further comprising:
  receiving read requests for the contents stored in virtual memory disk (VMDK) files located in the storage devices from the workloads associated with the host computing systems in the cluster.

28. The non-transitory computer-readable storage medium of claim 23, further comprising:

substantially simultaneously updating each of remaining GDTs upon adding a hash signature of metadata associated with current read content along with an associated host computing system ID in one of the GDTs via a cache digest trunk (CDT).

29. The non-transitory computer-readable storage medium of claim 23, further comprising:
substantially simultaneously updating each GDT by removing corresponding hash signatures and associated host computing system IDs via a cache digest trunk (CDT) upon removing any one of the host computing systems in the cluster.

30. The non-transitory computer-readable storage medium of claim 23, further comprising:
substantially simultaneously creating a replica of the GDT in a host computing system via a cache digest trunk (CDT) upon adding the host computing system in the cluster.

31. The non-transitory computer-readable storage medium of claim 23, wherein the host computing system IDs are assigned unique host computing system IDs for tagging the host computing systems in the GDT.

32. The non-transitory computer-readable storage medium of claim 23, wherein the cache content usage characteristics are locations of the workloads in the host computing systems, contents requested by the workloads and frequency of read requests made for substantially same contents.

33. The non-transitory computer-readable storage medium of claim 23, wherein the content comprises a length of 4 kilo bytes.

34. The method of claim 1, wherein loading the GDT onto the memory of the host computing systems comprises:
creating the GDT upon enabling one of the host computing systems in the cluster;
loading the created GDT onto memory of the one of the host computing systems; and
loading the created GUT onto memory of each of remaining host computing systems upon powering on the workloads associated with each subsequent host computing system in the cluster via a cache digest trunk (CDT).

35. The system of claim 12, wherein the VMS is configured to load the GDT onto the memory of the host computing systems by:
creating the GDT upon enabling one of the host computing systems in the cluster;
loading the created GDT onto memory of the one of the host computing systems; and
loading the created GDT onto memory of each of remaining host computing systems upon powering on the workloads associated with each subsequent host computing system in the duster via a cache digest trunk (CDT).

36. The non-transitory computer-readable storage medium of claim 23, wherein loading the GDT onto the memory of the host computing systems comprises:
creating the GDT upon enabling one of the host computing systems in the duster;
loading the created GDT onto memory of the one of the host computing systems; and
loading the created GDT onto memory of each of remaining host computing systems upon powering on the workloads associated with each subsequent host computing system in the cluster via a cache digest trunk (CDT).

* * * * *